May 30, 1939.    W. L. MORRISON    2,160,439
BUMPER DEVICE
Filed June 21, 1935
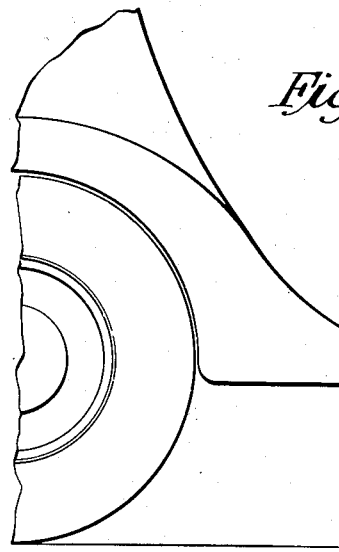
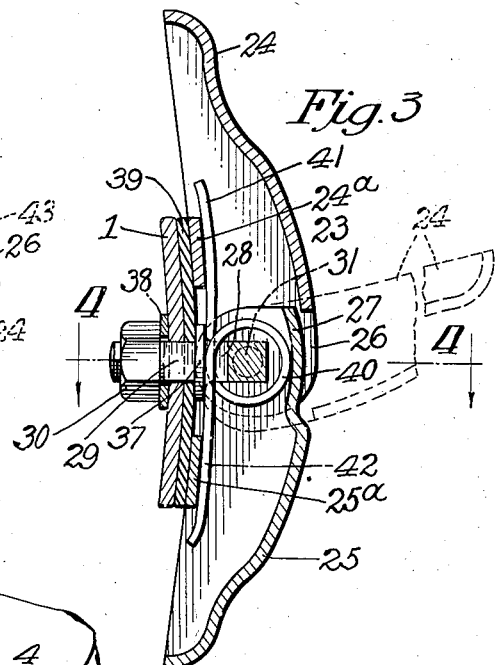
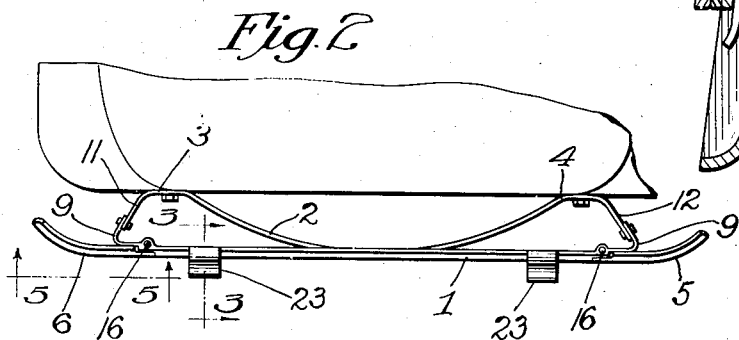
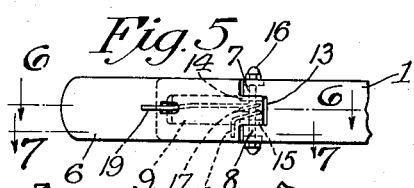
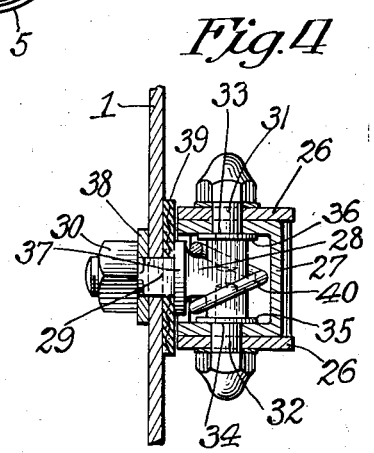
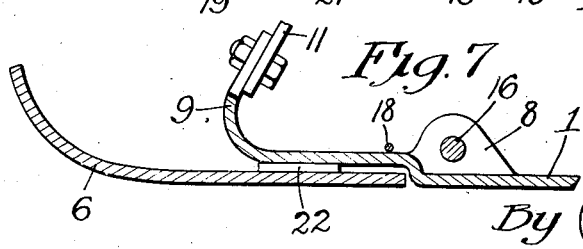
Inventor
Willard L. Morrison
By Parker & Carter
Attys.

Patented May 30, 1939

2,160,439

UNITED STATES PATENT OFFICE 2,160,439

BUMPER DEVICE

Willard L. Morrison, Lake Forest, Ill.

Application June 21, 1935, Serial No. 27,695

11 Claims. (Cl. 293—55)

This invention relates to bumper devices for vehicles such as automobiles and the like and has for its object to provide a new and improved device of this description.

The invention has as a further object to provide a bumper device which will properly take the bumper shocks between two vehicles, but will prevent the bumpers from becoming entangled or locked together.

The invention has other objects which will be more particularly pointed out in the accompanying description.

Referring now to the drawing,

Fig. 1 is the rear view of a portion of an automobile, showing a bumper device attached thereto, embodying one form of the invention, and an overlapping bumper part of another vehicle;

Fig. 2 is a plan view of the rear end of an automobile, showing one form of bumper device embodying the invention;

Fig. 3 is an enlarged sectional view taken on line 3—3 of Fig. 2;

Fig. 4 is a sectional view taken on line 4—4 of Fig. 3;

Fig. 5 is an enlarged sectional view taken on line 5—5 of Fig. 2;

Fig. 6 is an enlarged sectional view taken on line 6—6 of Fig. 5;

Fig. 7 is an enlarged sectional view taken on line 7—7 of Fig. 5.

Like numerals refer to like parts throughout the several figures.

In the present construction of automobiles it is important, and in fact essential, to have a bumper portion at the front and at the rear. It often happens that the bumpers of one car become interlocked with the bumpers of another car and in such event the disconnecting of the bumper presents a difficult and serious problem, and this is particularly true when the bumpers interlock at times when there is only one person in each car or the people in the car are women.

Manufacturers have attempted to standardize the bumpers but there are many old cars still in use which are higher than the present cars and with which the present cars' bumpers will interlock. Furthermore, if a car with a standardized bumper is full of people and backs in to park, the rear will be down and may easily interlock with the bumper of an empty car when the people in the first car get out. It often happens in such an event that one man comes out and drives this first car and pulls the second car with him, without knowing it, which is liable to cause damage to the car and injury to other cars and people. It often happens also that when the cars are running in close formation due to the heavy traffic, the cars moving up and down due to the rough roads and the bumpers thus become interlocked when the cars touch one another, and this often causes serious accidents. The present device provides means for preventing this interlocking of the bumpers and at the same time providing a complete and fully efficient bumper construction.

Referring now to the drawing, wherein one form of the device is illustrated, the bumper device is shown as consisting of a central member 1 and a connecting member 2, preferably a spring member which acts to resist and cushion the blow on the bumper, which engages the central member and which has the outwardly bent portions 3 and 4, which are connected in any suitable manner to the vehicle. The central member 1 is provided with the end sections 5 and 6 which are movably or pivotally connected with the central section 1. In the construction shown, the central section 1 is provided with the pivot holding members 7 and 8, which are preferably integral with the central section and which have the projecting end portions 9 which are fastened to the end sections 11 and 12 of the connecting member 2.

The end sections 5 and 6 are similar and hence only one of them will be described in detail. Referring to the end section 6, it will be noted that the central section 1 is recessed at 13 between the pivot holding parts 7 and 8. The member 6 has the separated pivot holding parts 14 and 15, which fit into this recess and between the pivot holding parts 7 and 8, and the pivot 16 passes through all the parts. There is a spring 17 coiled around the pivot 16 between the pivot holding parts 14 and 15 and which has its end 18 bent down to engage the part 9, which is rigid with the central section 1. The other end 19 of the spring passes through an opening 20 in the part 9 and opening 21 in the end section 6 and engages the outer face of said section, as shown in Fig. 6, normally holding the section 6 into contact with the part 9. There is preferably an intermediate piece 22 between the end section 6 and the member 9. It will be seen that by means of this construction the end sections 5 and 6 are held against the parts 9 and that they resist any blows of other bumpers or other bodies moving toward the vehicle carrying the bumper device.

If, however, the ends of the bumpers become interlocked, or if any portion of one bumper becomes interlocked with an end section of another bumper, the end section, by a small amount of pressure sufficient to overcome the tension of the springs, will move about its pivot 16 and release the interlocking part. It will of course be seen that the interlocking parts can be easily and quickly released and this can be done by moving either car to which the interlocking parts are attached.

The bumpers also are provided with vertical members 23 which project above and below the central section 1, or any part of the bumper with which they are connected. These vertical members are made in two parts 24 and 25, which have lapping parts 26 and 27 movably connected with the bumper section 1. The particular pivotal construction and connection of the parts may be made in any desired manner and I have illustrated one construction wherein there is a connecting member 28, which has a part 29 extending through the bumper element and attached thereto by the nut 30. The sections 24 and 25 fit over this connecting member, as shown in Fig. 4, and are pivotally connected thereto by the members 31 and 32, which preferably have threaded ends which fit into threaded openings in the connecting member 28. The members 31 and 32 are preferably provided with shoulders 33 and 34 and there are preferably provided washers 35 and 36 between these shoulders and connecting member 28. This arrangement prevents the members 31 and 32 from being tightened so tight as to interfere with the pivotal movement of the sections 24 and 25. The connecting member 28 is also preferably provided with a shoulder 37 so that the tightening of the nut 30 clamps the parts in position. I preferably provide the members 38 and 39 on opposite sides of the bumper as clearly shown in Fig. 4. The member 39, against which the parts 24 and 25 strike, is preferably of non-metallic material so as to prevent rattling or noise due to the contacting of the metal pieces 24 and 25. If these pieces contact with the metal member there might be rattling or noise under some conditions. There is a spring 40 which engages the holding member 28 and which has ends 41 and 42 which engage the parts 24a and 25a to hold the vertical bumper sections 24 and 25 against the part 39. In the particular construction shown, the ends of these springs engage the member 39. It will be seen that by means of this construction when pressure is applied to the rear of the vertical bumper sections 24 and 25, they will be pressed against the bumper 1 or the member 39 and resist the pressure applied thereto. If, however, the parts of one automobile become interlocked with another, they can be easily disconnected by simply moving the automobile relatively, for in that event the interlocking parts move about their pivots so as to be easily and quickly released. If, for example, the part 43 on another car becomes interlocked with the part 24, as shown in Fig. 1, then if the cars are moved relatively the part 24 simply moves about its pivot so as to quickly and easily release the interlocking parts.

I claim:

1. A bumper device comprising a horizontally extending bumper element, a vertically extending bumper element, pivotally connected with said horizontally extending bumper element, the horizontally extending bumper element holding said vertically extending bumper element in its blow resisting position when pressure is applied thereto by another vehicle in one direction, said vertically extending bumper element free to move about its pivot when interlocked with a part of another vehicle, so as to become released therefrom.

2. A bumper device comprising a horizontally extending bumper element, a vertically extending bumper element, comprising two sections pivotally connected with the horizontally extending bumper element, one projecting above and one below the horizontally extending bumper element, the horizontally extending bumper element acting to hold both of said sections in their blow resisting positions when struck by another vehicle, either of said sections being free to move about its pivot when interlocked with a part of another vehicle, so as to be easily disconnected therefrom.

3. A bumper device comprising a horizontally extending bumper element, a vertically extending bumper element, comprising two sections pivotally connected with the horizontally extending bumper element, one projecting above and one below the horizontally extending bumper element, the horizontally extending bumper element acting to hold both of said sections in their blow resisting positions when struck by another vehicle, either of said sections being free to move about its pivot when interlocked with a part of another vehicle, so as to be easily disconnected therefrom, and an elastic device for normally holding the sections of said vertically extending bumper element in blow resisting position.

4. A bumper device comprising a horizontally extending bumper element, a vertically extending bumper element, pivotally connected with said horizontally extending bumper element, the horizontally extending bumper element holding said vertically extending bumper element in its blow resisting position when pressure is applied thereto by another vehicle in one direction, said vertically extending bumper element free to move about its pivot when interlocked with a part of another vehicle, so as to become released therefrom, and means for holding said vertically extending bumper element in blow resisting position.

5. An automobile bumper comprising, in combination, a main transverse bumper and a guard mounted thereon and extending vertically both above and below the normal horizontal plane of the main bumper, and means whereby either or both of the vertically extending portions of said auxiliary guard member may move into substantially the same horizontal plane passing through the main bumper.

6. An automobile bumper comprising, in combination, a main transverse bumper and a guard mounted thereon and extending vertically both above and below the normal horizontal plane of the main bumper, means whereby either or both of the vertically extending portions of said auxiliary guard member may move into substantially the horizontal plane passing through the main bumper, and means for maintaining the parts in normal position.

7. An automobile bumper comprising, in combination, a main transverse bumper and a guard mounted thereon and extending vertically both above and below the normal horizontal plane of the main bumper, means whereby either or both of the vertically extending portions of said auxiliary guard member may move into substantially the horizontal plane passing through the main bumper, and means for maintaining the parts in normal position comprising a spring cooperating with the upwardly and downwardly extending parts of said guard member.

8. A bumper for automobiles comprising, in combination, a main transverse bumper member and a plurality of auxiliary vertically disposed guard members mounted thereon at spaced intervals, each of said guard members having an attaching means mounted upon said main bumper member, and means permitting said guard members to move longitudinally of the vehicle from their normal vertical position into a position substantially coincident with the horizontal plane passing through the main bumper.

9. A bumper for automobiles, comprising, in combination, a main transverse bumper member, and an auxiliary vertically disposed guard member extending substantially beyond the main bumper member and having means for attaching it to the main bumper member, and means permitting said guard member to move longitudinally of the vehicle from its normal vertical position into substantially a horizontal plane passing through the main bumper member.

10. A bumper for automobiles comprising, in combination, a main transverse bumper member, and an auxiliary vertically disposed guard member extending substantially beyond the main bumper member, and having means for attaching it to the main bumper member, means permitting said guard member to move longitudinally of the vehicle from its normal vertical position into substantially a horizontal plane passing through the main bumper member, and resilient means to maintain the auxiliary guard member in normal vertical position.

11. A bumper for automobiles comprising, in combination, a main transverse bumper member, an auxiliary vertically disposed guard member attached to said main bumper member and extending substantially beyond a longitudinal edge thereof, means for permitting said auxiliary guard member to move longitudinally of the vehicle in one direction from its normal vertical position into substantially a horizontal plane passing through the main bumper, and means for preventing movement of said auxiliary guard member in the opposite direction.

WILLARD L. MORRISON.